Feb. 10, 1959     R. PHILLIPS     2,873,006
BRAKE ADJUSTMENT MECHANISM
Filed Sept. 11, 1957

INVENTOR.
ROY PHILLIPS
BY Hudson, Coughton,
Williams, David & Hoffman
ATTORNEYS

United States Patent Office 2,873,006
Patented Feb. 10, 1959

2,873,006

BRAKE ADJUSTMENT MECHANISM

Roy Phillips, Redington Beach, Fla.

Application September 11, 1957, Serial No. 683,363

1 Claim. (Cl. 188—196)

The present invention relates to clearance adjusting devices, especially automatic brake clearance adjusting devices, and, more particularly, to an automatic brake clearance adjusting device of the type adapted to automatically provide a predetermined clearance between a retracted brake shoe and a brake drum.

An object of the present invention is the provision of a new and improved clearance adjusting device having means which prevents the device from operating to adjust clearance between two spaced members while above a predetermined temperature.

Another object of the present invention is the provision of a new and improved automatic brake clearance adjusting device which device contains automatic means for preventing the device from operating to change the clearance between a brake drum and a retracted brake shoe when the brake drum is at temperatures above a predetermined level.

A still further object of the invention is the provision of a new and improved automatic clearance adjusting device of the type comprising first and second members at least one of which is suitably supported for movement toward and away from the other member, a third member movably supported on said first member for adjustment relative thereto and adapted to limit movement of said second member toward said first member, means for advancing said third member toward said second member whenever the second member is more than a predetermined distance from said third member, and temperature responsive means rendering said first-mentioned means inoperative at temperatures above a predetermined temperature.

The further objects and advantages of the invention will be apparent to those skilled in the art to which the invention relates from the description of the following embodiments described with reference to the accompanying drawings forming a part of this specification, in which similar reference characters designate corresponding parts, and in which.

While the present invention is applicable to various types of clearance adjusting devices, it is herein shown as embodied in a device for automatically adjusting the retracted positions of the brakes of an automotive vehicle. According to the provisions of the present invention, the device includes temperature responsive means for preventing the device from automatically compensating for changes in clearance between members, which clearance the device is adapted to control, when the device is above a predetermined temperature.

Figure 1:
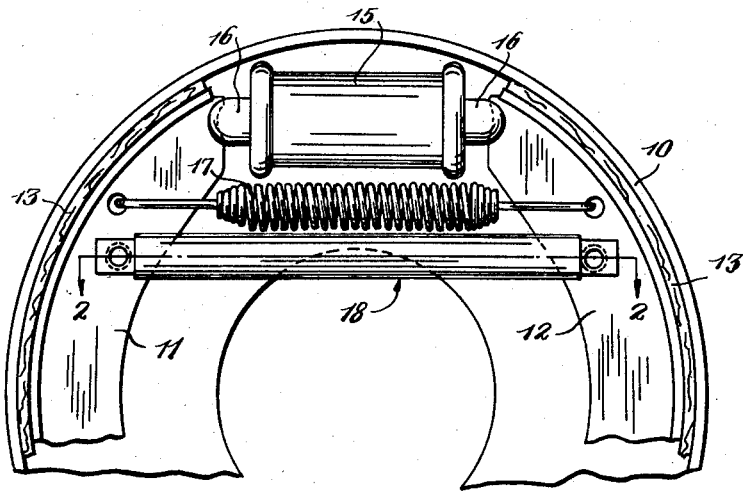
Fig. 1 is a fragmentary elevational view of a hydraulic friction brake embodying the present invention.

Referring to the drawing, the brake shown comprises a brake drum 10 and brake shoes 11, 12 provided with brake linings 13. The brake shoes are pivotally mounted at a point, not shown, for movement to braking position by a hydraulic cylinder 15 located intermediate the upper, adjacent, spaced ends of the brake shoes. When pressure is applied to the cylinder, hydraulic plungers 16 engaging the upper ends of the shoes move outwardly to expand the shoes and press the lining 13 into engagement with the brake drum, as shown in Fig. 1. A retracting spring 17 connected to the brake shoes adjacent to the brake cylinder pulls the brake shoes back into their nonbraking position when the pressure is removed from the hydraulic cylinder 15.

In order for the brake to function satisfactorily, it is desirable to have and maintain a predetermined clearance between the brake drum and the brake lining when the brake is in its nonbraking position. The clearance, however, between the lining and the drum will become greater as the brake is used due to the wear of the lining. The adjusting mechanism or device, designated generally as 18, automatically maintains a predetermined clearance between the lining and the brake drum as wear occurs, by determining the point to which the spring 17 returns the brake shoes 11, 12. The device is preferably constructed as a unit that may be quickly and easily attached to a conventional friction brake and is so shown in the drawings.

The adjusting device 18 comprises a tube or sleeve 20 having slidably supported therein coaxial members 21, 22 positioned in end-to-end relationship with their outer ends connected to the shoes 12, 11, respectively. The minimum spacing between the members 21, 22 is controlled by a spacing member 23 threaded into member 21 and provided with an abutment or shoulder 24 on a part projecting therefrom adapted to engage or abut the inner end 25 of member 22. The spring 17, in absence of overriding pressure in cylinder 15, will move the upper ends of of the brake shoes 11, 12 toward each other until the surfaces or abutments 24, 25 engage each other, thereby preventing further inward movement. The effective length of the members 21, 22 and the spacing member 23 determines the distance between the outer ends of the members 21, 22 when the brake is in its nonbraking position, and consequently the brake clearance. The members 21, 22 fit closely within the tube 20 but are freely slidable therein and the ends thereof projecting beyond the opposite ends of the tube 20 are provided with mounting pins 26 adapted to be inserted into drilled apertures in the brake shoes and secured therein by snap rings 27.

Figure 3:
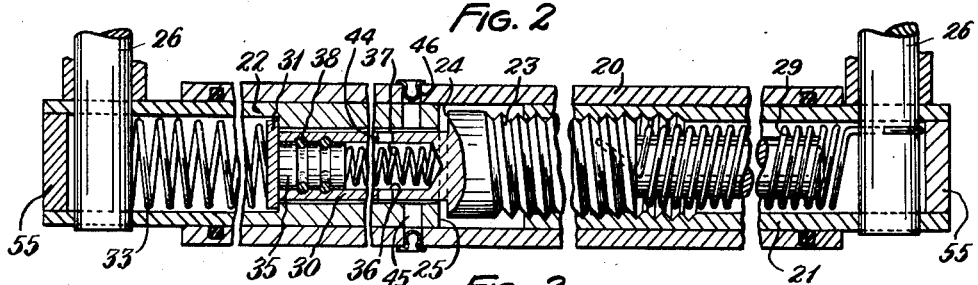
Fig. 3 is a view similar to Fig. 2 but showing the adjusting mechanism in the braking position.
Figure 4:
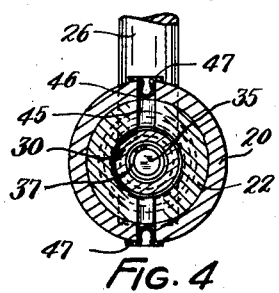
Fig. 4 is a sectional view taken approximately on the line 4—4 of Fig. 2.
Figure 5:
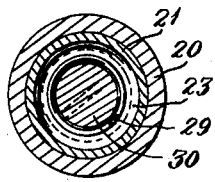
Fig. 5 is a sectional view taken approximately along the line 5—5 of Fig. 2.

When pressure is applied to the cylinder 15 to move the brake shoes to their braking position, the member 22 and the shoulder 24 on the member 23 will be moved apart, see Fig. 3. The free distance or space between the end 25 of the member 22 and the shoulder 24 of the member 21, i. e. the distance between the abutments 24, 25 when the shoes are in their braking position, will be a function of the clearance between the brake shoes or linings and the brake drum when the brake shoes are in their nonbraking position.

As wear occurs, the clearance between the lining and the drum, and the free space between the abutments 24, 25 tends to increase. The free space between the abutments when in braking position and, in turn, the brake clearance is maintained constant by the turning or threading of the member 23 toward the member 22 to compensate for wear as it occurs. To this end, a torsion spring 29 within the member 21 is interposed between the member 23 and the right-hand pin 26. The spring 29 tends to rotate the member 23 so that it will be threaded outwardly of member 21 toward member 22. The rotation, however, of member 23 is prevented when the brake clearance is as described by the engagement of the end of a rod-like counterbored projection 30 on the left-hand end of the member 23 with a disk-like member 31 located within and positioned transversely of the counterbored, left-hand end of the member 22. A pilot projecting from the right-hand end of the member 23 functions as a guide rod for spring 29.

Figure 2:
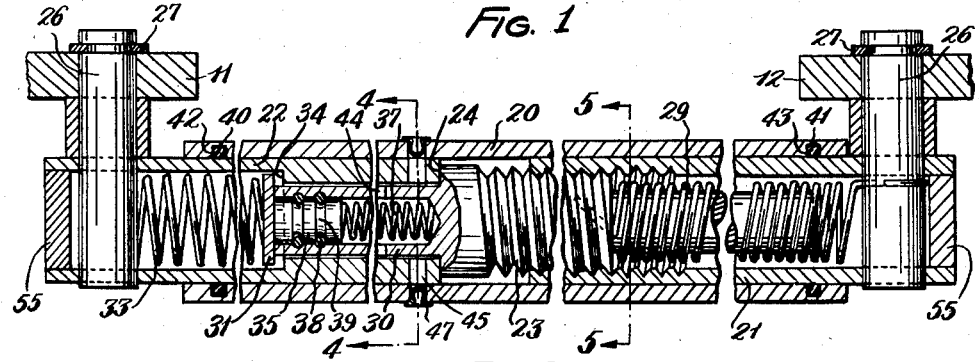
Fig. 2 is an enlarged sectional view taken along line 2—2 of Fig. 1 and showing the brake adjusting mechanism in the nonbraking or retracted position.

The member 31 is biased in a direction towards the end of rod 30 by a compression spring 33 within the member 22 intermediate the disk 31 and the left-hand pin 26. When the member 22 and the member 23 are moved apart, the rod 30 will be withdrawn, in part, from the member 22. The disk 31 will follow and maintain abutting engagement with the end of the rod-like projection 30 until it strikes the shoulder 34 at the bottom of the counterbore in the member 22 within which it is located. At this point, if the relative movement between member 23 and member 22 is continued, as is the case when wear occurs, the end of the projection 30 will tend to lose contact with the disk 31 but will be prevented from so doing by the spring 29 which will thread the member 23 outwardly of member 21 to maintain an abutting engagement between the end of the projection 30 and the disk 31. A predetermined maximum free distance is, therefore, always maintained between the abutment or shoulder 24 of the member 23 and the end or abutment 25 of the member 22, which distance is equal to the length of that portion of the projection 30 extending beyond the shoulder 34 when the member 22 and member 23 are in abutting or nonbraking relationship. By proportioning the parts so that the projection 30 extends a distance beyond the shoulder 34, which is proportioned to the desired brake clearance when the member 22 and member 23 are in their abutting or nonbraking position, as is shown in Fig. 2, the proper brake clearance will be maintained as wear occurs by the automatic threading of member 23 outwardly to increase the spacing between members 21, 22.

Upon prolonged application of the brake sufficient heat may be developed to expand the drum 10, in which event the brake shoes move outwardly accordingly. As the brake shoes move outwardly, the effective length of the members 21, 22 and the member 23 increases and except for compensating means hereinafter explained, the member 23 would thread outwardly of the member 21, as previously explained, to take up the additional clearance with the result that when the brake was again released, the brake shoes 11, 12 would not return to their original position but to a slightly more expanded position. The predetermined clearance between the brake shoes and the brake drum would thus be maintained but upon cooling of the brake drum it would retract, reducing the clearance between it and the brake shoes and possibly eliminating the clearance altogether, in which event the brakes would be set or would bind. The heat produced by the application of the brakes, and which causes the brake drum to expand, may also produce a certain amount of expansion of the members 21, 22 and the member 23, but under normal circumstances the temperature of these parts would not rise in proportion to the temperature of the brake drum, with the result that the normal expansion and contraction thereof would not equal that of the brake drum.

According to the provisions of the present invention, temporary expansion of the brake drum due to heat created therein by prolonged application of the brakes is prevented from effecting the normal clearance desired and maintained between the brake shoes 11 and 12 and brake drum 10 by the imposition of temperature responsive means which in the present embodiment comprises a plug or member 35 located in a counterbore 36 in the left-hand end of the projection 30. The member 35 is spring biased toward the open end of the counterbore 36 by a spring 37 located between the member 35 and the bottom of the counterbore but is normally fixed in the counterbore with its left-hand end flush with the end of the rod-like projection 30 by an alloy or material 38 having a low melting temperature, that is, a temperature slightly above temperatures to which the brake is subjected in normal operation. A suitable material is one formed of bismuth 44.7%, lead 22.6%, tin 8.3%, cadmium 5.3%, indium 19.1%, which melts at about 117° F. Materials which melt at temperatures of approximately 100° F. to 200° F. are suitable for my purpose depending to some extent upon normal atmospheric temperatures prevailing in the locality and service conditions to which the brake is subjected in use. Suitable materials having various desired melting points are commercially available under the name "Cerro" metals. In the embodiment shown the plug-like member 35 is provided with a plurality of annular grooves 39 which help to retain the material 38 within the counterbore of the end of the rod 30 when it is in its liquid state.

The operation is quite simple. Upon a predetermined rise in temperature incident to prolonged application of the brakes, the material 38 will melt allowing the spring 37 to bias the member 35 outwardly and hold it firmly against the disk 31 and prevents member 23 from being advanced toward the member 22 by the spring 29 even though wear has occurred. After the brakes are released and the temperature becomes normal or slightly below normal, the member 35 will reassume a position flush with the end of the member 30 and the material 38 will solidify. Upon the next application of the brakes, in the event wear has occurred in the interim, members 21 and 22 will be moved farther apart than they had previously been and neither the end of rod 30 nor the plug 35 will engage the disk 31, whereupon spring 29 will be free to advance the member 23 and the member 30 until it again engages the disk.

For the proper functioning of the device, the spring 33 must be able to overcome spring 37 which in turn must be strong enough to overcome the rotational forces applied to the member 23 but in no case are the springs strong enough to interfere with the function of the brake shoe return spring 17.

It will be noted from the drawings that the tube 20 and the members 21, 22 are of maximum length consistent with the space limitations imposed by the size of the brake, thereby providing long, overlapping, sliding connections which permit free operation of the various parts and prevent any sagging and binding. The members 21, 22 float, so to speak, within the tube 20 and no binding forces or stresses are imposed upon the threaded connection between the member 21 and the member 23 other than those required to perform the desired operation. The projecting ends of members 21 and 22 are closed by plugs 55 to assure that the operating parts will remain free from dust and dirt. To aid in this regard, O-ring or other type seals may be positioned between tube 20 and members 21 and 22. This may preferably be accomplished by means of O-rings 40 and 41 positioned in annular grooves 42 and 43, respectively, in the outer ends of the tube 20.

If the adjusting mechanism, when installed, is adjusted so that the shoes have a greater clearance in their nonbraking position than that desired, the member 23 will be threaded outwardly the first time the brakes are applied to automatically adjust the effective length of members 21, 22 and member 23 and thereafter the lining on the shoes will have the desired proper clearance with respect to the brake drum when returned to their nonbraking position.

The adjusting mechanism may be assembled and shipped with a wire inserted through suitable holes 44, 45 and 46 in parts 30, 22 and 20, respectively. Alternatively the wire may be inserted through holes, not shown, through parts 20, 21 and 23, for keeping them together during shipment, etc., such that the effective length of the device is a minimum. When the device is to be installed, the brake shoes are moved to their full retracted positions and the wire inserted through holes in parts 20, 21 and 23 is removed and member 21 is screwed out until the center-to-center distance of pins 26 corresponds to the distance between the receiving apertures in the brake shoes 11 and 12. The pins 26 are then inserted into their receiving apertures and locked in place by the insertion of the snap rings 27. Rubber plugs 47 are installed in the holes in the tube 20 to seal out water and dirt. The device will automatically adjust itself as previously described and is ready for use.

While the members 21, 22 have been described as both being slidably mounted in the tube 20, the invention will function satisfactorily, if one of the members 21, 22 is fixed with respect to, or formed integral with tube 20, and the other slidable so long as a long, well overlapping, sliding connection is maintained, thereby avoiding any sagging, etc. of the parts which might tend to interfere with their free and easy operation.

While the preferred embodiment of the invention has been described in considerable detail, I do not wish to be limited to the particular construction shown which may be varied within the scope of the invention, and it is the intention to cover hereby all adaptations, modifications and arrangements thereof which come within the practice of those skilled in the art to which the invention relates.

Having thus described my invention, I claim:

A brake adjusting device comprising a sleeve, a first and a second member connected by said sleeve for relative reciprocable movement toward and from each other, a third member threaded into said first member and projecting therefrom toward said second member, means on said second and third members limiting relative movement therebetween in the direction toward each other, spring means connected between said first and third members biasing said third member for rotation relative to said first member in a direction to move said third member toward said second member, one of said second and third members being provided with an enlarged axially extending counterbore forming a shoulder spaced from the end of said member facing said other member and having an axially extending aperture of smaller diameter extending between the bottom of said counterbore and said end of said member, the other of said members having a counterbored projection extending into said aperture the end of which comprises an abutment means extending into said counterbore a predetermined distance when said second and third members are at the limit of their movement toward each other, a fourth member reciprocable in said counterbore, means biasing said fourth member toward said shoulder formed by said counterbore and into engagement with the end of said projection forming said abutment means for holding said third member against rotation by said spring means relative to said first member while the end of said projection projects into said counterbore, a plug-like member in the counterbored end of said projection, means biasing said plug-like member outwardly of said counterbored end of said projection and in a direction toward said fourth member, and a low temperature melting point material interposed between said plug-like member and the wall of said projection within which it is positioned and fixedly securing said plug-like member to said projection at temperatures below the melting temperature of said material.

References Cited in the file of this patent

UNITED STATES PATENTS 2,818,143   Phillips _____ Dec. 31, 1957